United States Patent [19]

Olson

[11] 4,378,474

[45] Mar. 29, 1983

[54] ROTARY SWITCH DEVICE FOR AUTOMOTIVE TRANSMISSION CONTROL

[75] Inventor: Paul E. Olson, Lexington, Ky.

[73] Assignee: American Standard Inc., Lexington, Ky.

[21] Appl. No.: 276,138

[22] Filed: Jun. 22, 1981

[51] Int. Cl.³ ...................... H01H 83/00; H01H 9/06
[52] U.S. Cl. ................................. 200/12; 200/61.88; 200/61.91
[58] Field of Search .................... 200/11 R, 12, 61.28, 200/61.88, 61.89, 61.91, 13; 335/1-3

[56] References Cited

U.S. PATENT DOCUMENTS

| 2,608,624 | 8/1952 | Goodrich | 200/12 |
| 2,924,680 | 2/1960 | Swenson | 200/12 X |
| 3,326,315 | 6/1967 | Richards | 200/61.88 |
| 3,898,401 | 8/1975 | Noba et al. | 200/61.91 |

*Primary Examiner*—J. R. Scott

*Attorney, Agent, or Firm*—R. S. Visk

[57] ABSTRACT

An electrical switch device manually operable, by a rotatable knob, to a plurality of definable positions for selectively effecting operation of an automotive transmission to a desired gear ratio. The knob and a housing, which includes the switch, may be mounted any place in the vehicle cab within convenient reach of the operator. The switch device is connected to an electronic logic system which monitors the condition of the transmission at all times to either energize or deenergize a lock-out solenoid, which controls a latch mechanism. Depending upon the condition of the transmission and, therefore, of the solenoid, a latch mechanism either permits or inhibits operation of the knob. An override mechanism permits the operator to release the latch mechanism to permit operation of the knob and the switch for shifting of the transmission, in an emergency situation, notwithstanding that the latch mechanism is in a locked position.

8 Claims, 7 Drawing Figures

ROTARY SWITCH DEVICE FOR AUTOMOTIVE TRANSMISSION CONTROL

BACKGROUND OF THE INVENTION

Presently known switch devices for controlling shifting of automotive transmissions are normally restricted to use with a single type of transmission only. Thus, a different switch device must be available for each type of transmission using electronic switch devices for shifting purposes. It is also desirable to have lock-out means which permits full movement of the shift lever when internal conditions of the transmission are favorable, but inhibits lever travel from the drive, reverse, and neutral positions when such internal conditions are not favorable such as when drive shaft input and output relationships are unfavorable. In an emergency situation, if the operator feels that the transmission should be shifted, notwithstanding that the lock-out means is engaged, it would also be desirable to have an overriding mechanism to permit the operator to shift to transmission by overriding the lock-out means.

SUMMARY OF THE INVENTION

The object of the present invention, therefore, is to provide an electronic switch device for controlling shifting of an automotive transmission, said switch device being adaptable for use with a plurality of different types of transmissions, having lock-out means for normally preventing shifting operation during an unfavorable condition of driveshaft input relative to driveshaft output, and having an overriding mechanism which permits the operator, in an emergency situation, to effect shifting of the transmission by overriding the lock-out means.

Briefly, the invention comprises a housing in which a multiple position rotary switch is disposed and operable by a hand knob to a selected position. The knob may be turned to a different position by depressing a release button if conditions in the transmission are favorable. As long as the transmission conditions are favorable, a solenoid, also disposed in the casing, remains energized to keep a blocking member in an unblocked condition relative to the release button, so that the release button may be operated, otherwise the solenoid is deenergized to operate the blocking member to a blocking position for preventing operation of the release button. An overriding mechanism is also provided in the housing which enables the operator in an emergency situation to unblock the release button so that the rotary switch may be operated through the neutral, reverse, or drive positions to a different position if necessary.

DESCRIPTION AND OPERATION

Figure 1:
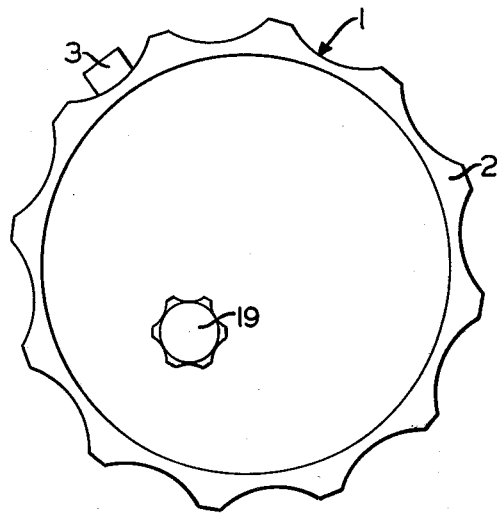
FIG. 1 is a frontal view of a gear shift selector switch device, in outline, embodying the invention.
Figure 3:
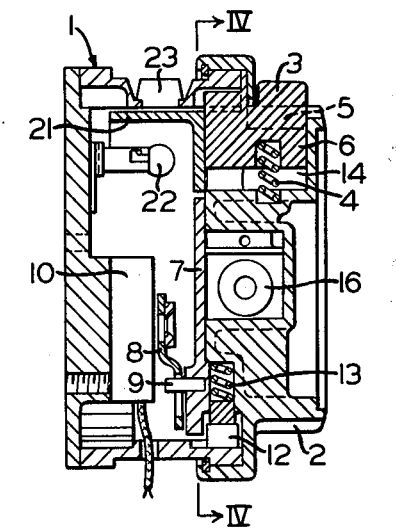
FIG. 3 is a sectional view of the switch device shown in FIG. 1 as taken along line III—III of FIG. 2 looking in the direction indicated by the arrows.

As shown in FIG. 1, a gear shift selector switch device 1 is provided with a hand rotatable knob 2 for selecting one of a multiple gear shift positions as shown in FIG. 1. In order to rotate knob 2, a release button 3 biased by a spring 4 must be depressed so that a tab 5 of a positioning member 6 clears the particular notch which it is occupying at the time, thus permitting said knob to be rotated to the selected position. See FIGS. 3 and 4. Knob 2 supports a carrier member 7 rotatable therewith and on which release button 3 and positioning member 6 are carried.

A switch arm 8, coupled by a pin 9 to the carrier member 7 rotatable with knob 2, is operated by the knob to a position corresponding to that of the knob for actuating a switch member 10 accordingly. Switch member 10 may be any suitable commercial type, and since a detailed description thereof is not essential to an understanding of the invention, it need merely be mentioned that in each position a certain circuit is completed for effecting operation of the transmission to a corresponding gear position, as selected.

A detent mechanism including a plurality of notches 11 into which a detent member 12 is biased by a spring 13 for positively positioning knob 2 and, therefore, switch 10 in the selected position.

Figure 4:
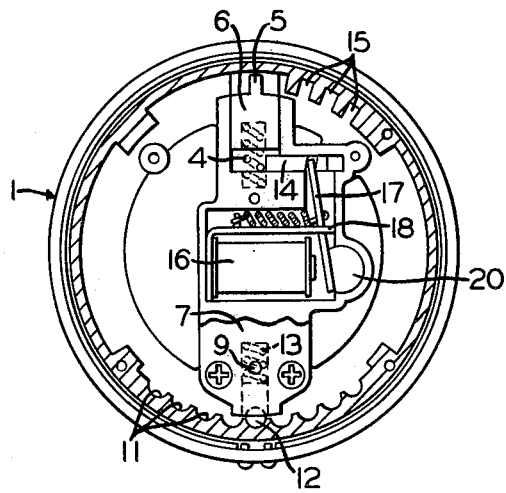
FIG. 4 is a sectional view of the switch device shown in FIG. 1 as taken along line IV—IV of FIG. 3 looking in the direction indicated by the arrows.

The gear shift selector switch device 1 further includes a blocking member 14 slidably disposed adjacent the lower end of positioning member 6, as best seen in FIG. 4, in which said blocking member is shown in a blocking position for preventing operation of said positioning member to a release position in which tab 5 is moved out of the particular notch of the gear shift position notches 15 occupied at the time.

A solenoid 16 is disposed in carrier member 7 and is connected to a monitoring device (not shown) which monitors the condition of the transmission such as the relationship of driveshaft input to output. Assuming the condition of the transmission (not shown) is favorable, the monitoring device (not shown) effects energization of solenoid 16, which, in turn, effects clockwise pivoting motion of a lever 17 about a pivot point 18, so that said lever, connected to blocking member 14, causes said blocking member to be withdrawn from its blocking position to an unblocking position thus permitting free movement of button 3. If an unfavorable condition of the transmission exists, the monitoring device (not shown) causes solenoid 16 to be deenergized to cause blocking member 14 to be operated to its blocking position by counterclockwise movement of lever 17, thereby preventing release of positioning member 6 and operation of knob 2.

Notwithstanding that, due to an unfavorable condition of the transmission, so that blocking member 14 is in its blocking position to prevent downward movement of button 3, the operator, in an emergency situation, may still effect a gear change.

A smaller externally disposed knob 19 is connected to an internally disposed cam 20 which contacts lever 17.

See FIG. 4. In an emergency situation, if the operator feels it necessary to effect a gear shift of the transmission, he turns small knob 19 which causes clockwise pivoting motion of lever 17 and consequent unblocking of release button 3 and member 6. The operator may then turn larger knob 2 to the desired position. It is significant to note that the operator must use both hands to override the blocking mechanism in an emergency situation.

Figure 2:
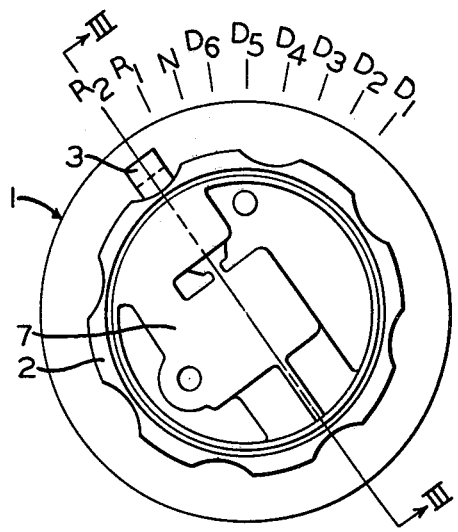
FIG. 2 is a frontal view of the switch device shown in FIG. 1, in outline and on a smaller scale than FIG. 1, with the front cover plate removed.

Switch device 1 is provided with a position indicator board 21 showing the positions as indicated in FIG. 2 and having a light 22 and a magnifying lens 23 for assisting in reading said board.

Figures 5, 6, 7:
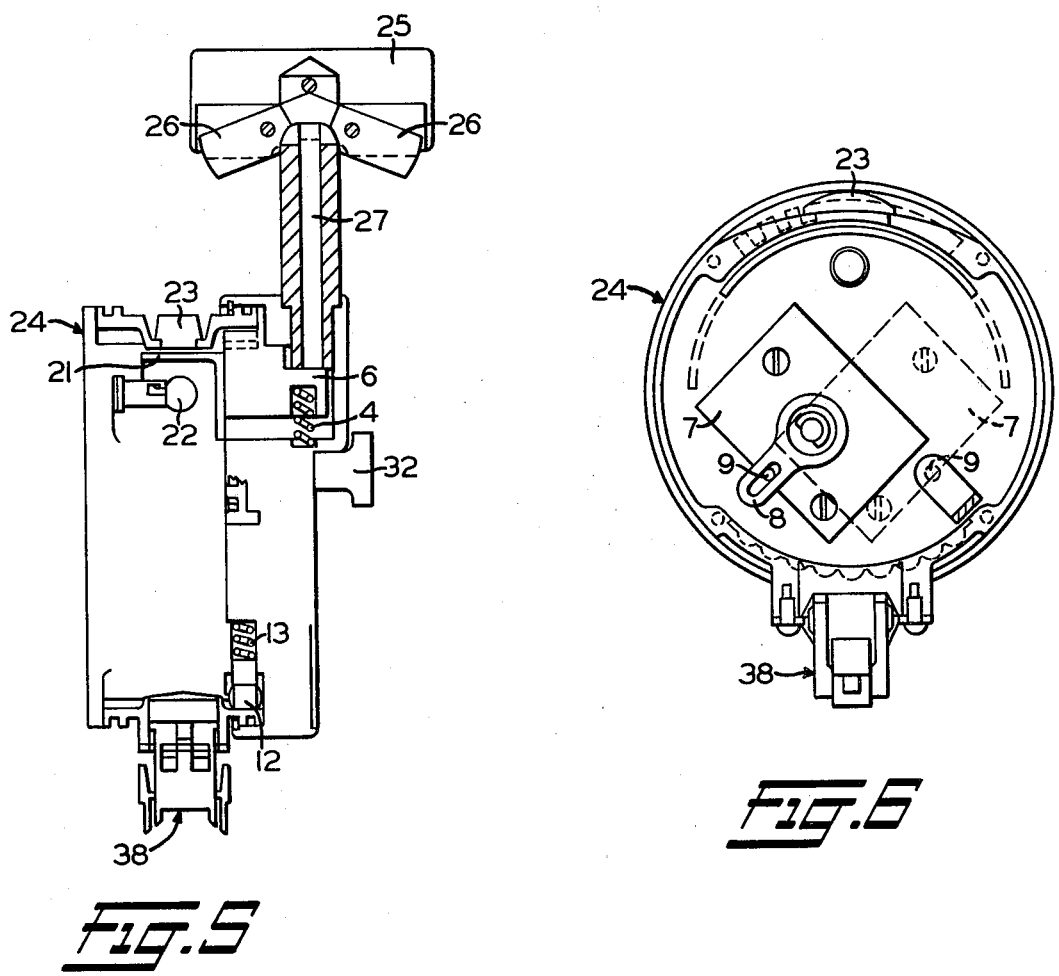
FIG. 5 is an elevational view, generally in outline, of a modified version of a gear shift selector switch device, with certain details omitted.
FIG. 6 is a partial rear view of the switch device shown in FIG. 5.
FIG. 7 is a sectional view of the switch device shown in FIG. 5 taken along line VII—VII of FIG. 5 as viewed in the direction indicated by the arrows.

A switch device 24 shown in FIG. 5 is similar in function to that shown in FIGS. 1 through 4, except that a pivotable hand lever 25 is substituted for knob 2. A pair of wing-like levers 26, when depressed or squeezed, act to force a release rod 27 downwardly to replace the function of release button 3.

Similarly to switch device 1, switch device 24 is also provided with an overriding mechanism for permitting the operator to effect gear shift operation in an emergency situation, notwithstanding that a blocking member 28 is in a blocking position due to an unfavorable condition of the transmission (not shown). In its blocking position, in which it is shown in FIG. 7, a right-hand end 29 thereof, as viewed in the drawing, is abutted by a first tooth 30 of a series of notches 31, or may be engaged in one of said notches, depending upon the position of the transmission when the unfavorable condition occurs, so that operation of handle 25 is inhibited. A small knob 32 (see FIG. 5) is connected to an eccentric 33 having one end of a link 34 eccentrically connected thereto. The other end of link 34 is pivotally connected to one end of an intermediate link 35, the other end of said intermediate link being connected to a spring bar 36 (not shown) which is coupled to a spring 37 which normally subjects the lower end of lever 17 to tensional force for holding blocking member 28 in its blocking position, as shown. When knob 29 is rotated, eccentric 30 pulls link 34 leftwardly and rotates intermediate link 35 which, in turn, acts to increase the tension of spring 37 on lever 17, so that in so doing said lever is pivoted counterclockwise to withdraw blocking member 28 from its blocking position to permit operation of hand lever 25 to the desired position.

FIG. 6 serves to illustrate how switch device 24 may be modified so that it may be mounted in various positions of the truck cab in convenient reach for the operator. Similarly to switch device 1, switch device 24 includes switch member 7 coupled to hand lever 25 by pin 9 and switch arm 8. If it is desired to change the location of the switch device so that the operator would use his other hand for operation, it is merely necessary to invert switch member 7 so that it is engaged by pin 9 which is also relocated, as shown. Thus, the operator may operate the switch device 24 in its new position by rotating hand lever 25 in the same direction as in its previous position.

Each of the switch devices 1 and 24 is provided with an electrical receptacle or plug-in connector 38, such as shown in FIGS. 5 and 6 only, to provide means for making electrical connections to the logic device (not shown) and to the transmission (not shown).

Having thus described the invention, what I claim as new and desire to secure by Letters Patent, is:

1. A rotary switch device for controlling gear shifting of an automotive transmission comprising:
   (a) a housing in which a switch member is mounted;
   (b) a multi-position switch member carried in said housing and electrically connectable to the transmission for transmitting an operational signal thereto in accordance with the position of the switch member selected;
   (c) manually operable position means for selectively operating said switch member to one of its positions;
   (d) inhibiting means normally mounted in said housing for restricting operation of said manually operable position means in response to a remotely located monitoring device on such transmission, said inhibiting means occupying a release position in which said manually operable means is freely operable to any of its positions, said inhibiting means being energizable in response to such monitoring device to occupy a blocking position in which operation of said manually operable position means is inhibited; and
   (e) manually operable override means engaging said inhibiting means for manually operating said inhibiting means to a release position in which said manually operable position means may be operated to any of its positions.

2. A rotary switch device, as set forth in claim 1, wherein said manually operable position means comprises a manually rotatable member coupled by a switch arm to said switch member for selectively positioning said switch member, said rotatable member including spring biased lock means for locking said rotatable member in the selected position, and a release button mechanism by which said rotatable member may be freed from its selected position to be operated to another position.

3. A rotary switch device, as set forth in claim 2, wherein said inhibiting means comprises a blocking member slidably disposed between said release button mechanism and a positioning member carried by said manually rotatable member for defining the several positions, and a solenoid energized responsively to a normal condition of the transmission for operating and retaining said blocking member in its unblocking position.

4. A rotary switch device, as set forth in claim 3 wherein said override means comprises a pivotable lever having one end engaged with said blocking member and operable by said solenoid, when energized, for moving said blocking member to its blocking position, and a manually operable cam member engaging said lever and effective, when manually rotated for causing said lever to move said blocking member to its unblocking position.

5. A rotary switch device, as set forth in claim 4, wherein said manually rotatable member further comprises a pivotable hand lever coupled to said switch arm and carrying release means for releasing the hand lever to permit operation thereof to a different position.

6. A rotary switch device, as set forth in claims 2 or 5, further characterized by spring-biased detent means connected to said manually rotatable member and engageable with notches formed peripherally in said housing for defining the several positions of the position means.

7. A rotary switch device, as set forth in claim 2, wherein said switch member is positionally reversible in said housing for converting the switch device from a normally right-hand operable device to a left-hand operable device.

8. A rotary switch device, as set forth in claim 2, wherein the switch is further characterized by an electrical plug-in connector by which the switch device may be electrically connected to a logic device or a transmission.

* * * * *